United States Patent [19]

Smith et al.

[11] 4,091,077

[45] May 23, 1978

[54] PROCESS FOR RECOVERING FILLER FROM POLYMER

[75] Inventors: Maurice L. Smith, Kansas City, Mo.; Robert M. Smith, Olathe, Kans.

[73] Assignee: The United States of America as represented by the United States Department of Energy, Washington, D.C.

[21] Appl. No.: 824,191

[22] Filed: Aug. 12, 1977

[51] Int. Cl.$^2$ .............................................. C01B 35/00
[52] U.S. Cl. .................................. 423/298; 159/47 R
[58] Field of Search ................... 423/276, 298; 159/47

[56] References Cited

U.S. PATENT DOCUMENTS

| 3,476,526 | 11/1969 | Hartzel | 423/298 |
| 3,887,687 | 6/1975 | Buford | 423/298 X |

Primary Examiner—G. O. Peters
Attorney, Agent, or Firm—Dean F. Carlson; Dudley W. King; Robert Southworth III

[57] ABSTRACT

This disclosure relates to a process for recovering filler material from a polymeric matrix by reacting the matrix at an elevated temperature in a gas atmosphere with a controlled oxidizing potential and thereafter separating and cleaning the residue from the reaction mixture.

5 Claims, 3 Drawing Figures

PROCESS FOR RECOVERING FILLER FROM POLYMER

FIELD OF THE INVENTION

The invention relates to chemical separation and more particularly to a chemical separation utilizing a controlled atmosphere pyrolysis.

BACKGROUND OF THE INVENTION

There are many applications for polymers having either organic or inorganic fillers within the polymeric matrix to provide a desired property or properties. One such application is in the nuclear field where various fillers, such as lead, cadmium or boron may be used as fillers in a polymeric matrix for nuclear or reactor shielding. These composites may possess the desirable nuclear shielding properties of the filler and the desirable mechanical properties of the polymeric matrix. It is sometims desirable to recover the filler from filled polymer surplus, scrap or waste. This is particularly true in the case of boron since it is relatively expensive.

Previous methods for recovering boron filler from a polymer matrix have various disadvantages. One approach is to disintegrate minced or ground boron-filled polymer with organic solvents, but this has the disadvantage of there not being inexpensive, effective solvents for some organic binder materials. Another approach is to heat the organic material in an air or oxygen atmosphere until the organic binder reacts. This approach has the disadvantage that an objectionable portion of the boron is oxidized during the reaction and may be lost if other recovery steps are not performed. A third approach is to heat the organic material in an inert atmosphere until it decomposes and to sunsequently extract the elemental boron from the resulting organic char by reacting it with a halogen, distilling off volatile boron halide and then reconverting the halide to elemental boron. This approach has the disadvantage of several relatively costly processing steps.

SUMMARY OF THE INVENTION

In view of the above, it is an object of this invention to provide a novel method for recovering a filler material from a polymeric matrix loaded with the material.

It is a further object of this invention to provide a method for recovering an easily oxidizable filler material in its pure, unreacted state from a polymeric matrix loaded with this material.

It is a further object of this invention to provide a method for recovering boron filler material from a polymeric matrix.

The invention comprises a method for recovering a filler material from a polymeric matrix by heating the filled matrix in a gas atmosphere with a controlled oxidizing potential such as a carbon dioxide atmosphere to a temperature to induce a reaction between the carbon dioxide and the polymeric matrix and subsequently separating the reaction products from the unreacted filler material.

BRIEF DESCRIPTION OF THE DRAWINGS

Other objects and advantages of the present invention will be apparent to those skilled in the art from the following description with reference to the appended claims wherein like numbers denote like parts and wherein:

DETAILED DESCRIPTION

Figure 1:
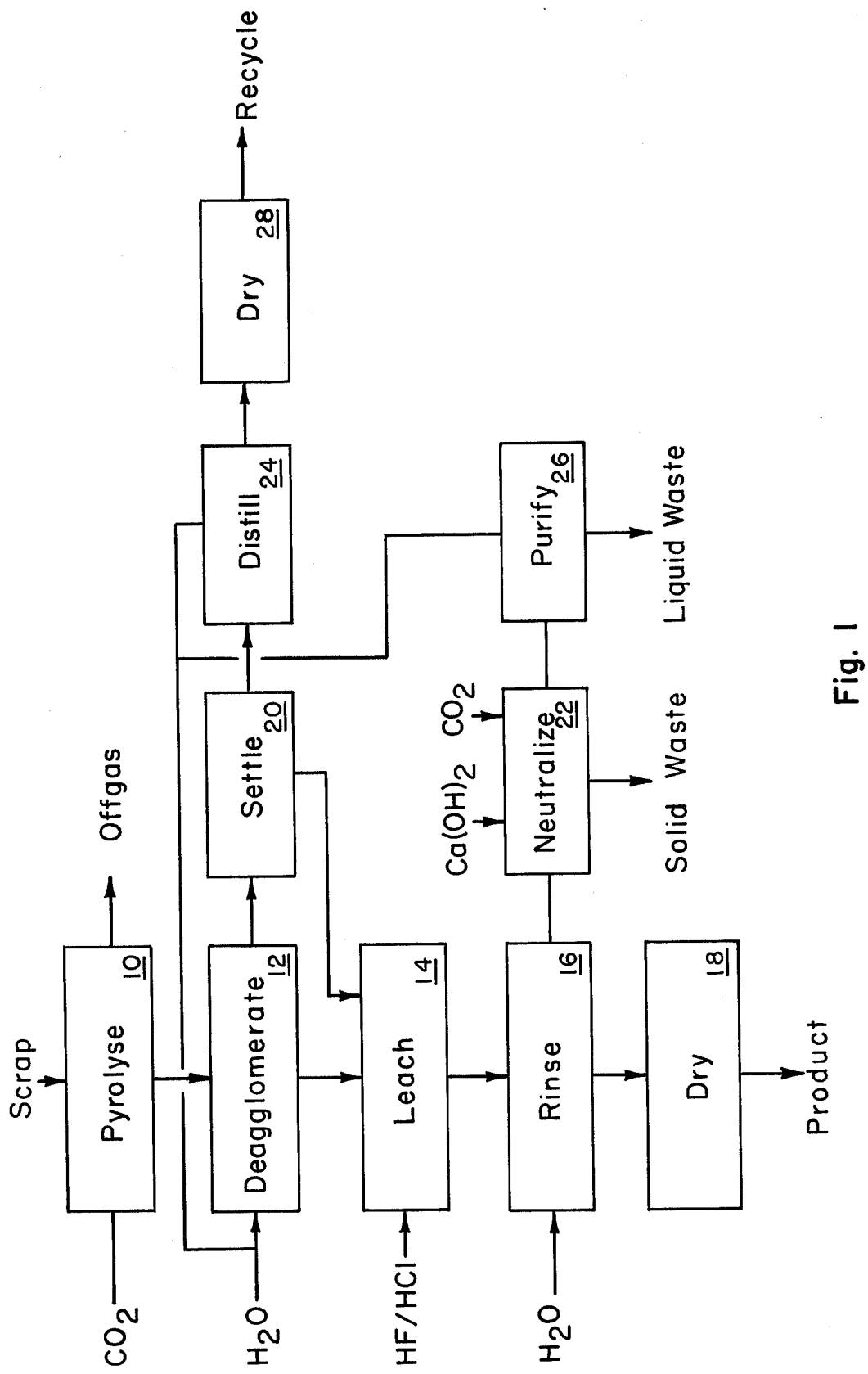
FIG. 1 is a flow chart illustrating the method of this invention.

Reference is now made to FIG. 1 which is a flow chart illustrating the method of this invention. As shown, boron filled polymer or scrap is pyrolyzed 10 in a carbon dioxide atmosphere. Although carbon dioxide gas is used in the preferred embodiment of the invention, the particular gas or gas mixture chosen will be affected by the nature of the filler material and the nature of the polymer matrix, the gas composition preferably being such that it is reactive with the polymer matrix and inert with the filler material.

The parameter by which the gas composition would be controlled is known as oxidation potential and is measured with an instrument such as a hot ceramic electrochemical sensor. This instrument senses either the proportion of oxygen present in an atmosphere or the ratio of burned combustibles to unburned combustibles. Because oxidation potential is proportional to gas temperature this parameter may be controlled by controlling the gas temperature. Furthermore, the oxidation potential may be controlled by the admixture with oxygen or an inert gas. It is to be understod that reference to carbon dioxide is intended to include such mixtures.

Figure 2:
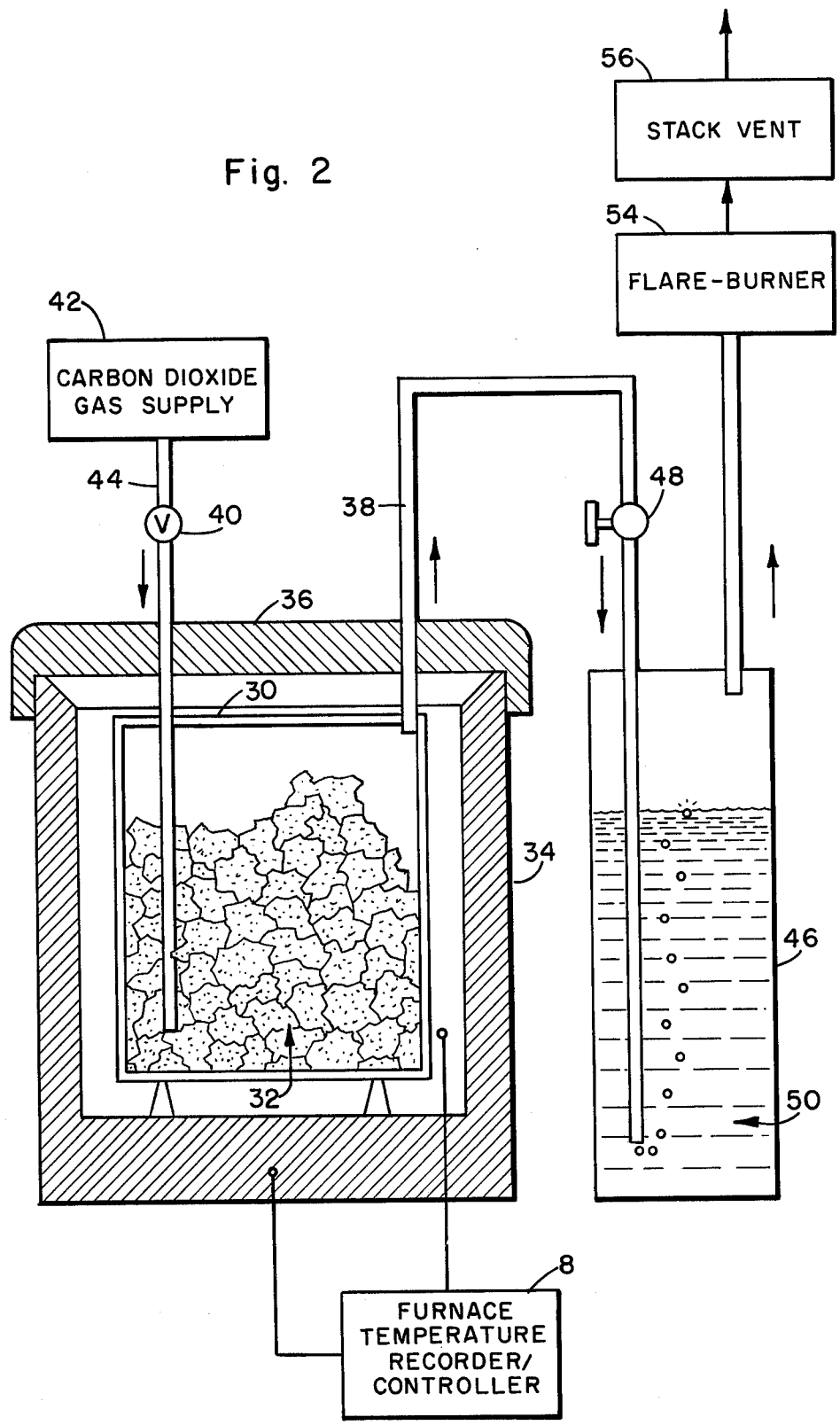
FIG. 2 illustrates an apparatus which is suitable for performing the controlled atmosphere pyrolysis step 10 of the method of this invention.

Reference is now made to FIG. 2 which illustrates apparatus suitable for performing the controlled atmosphere pyrolysis step of the method of this invention. As can be seen, a cannister or container 30 which has been previously loaded with boron filled polymer 32 is placed into a furnace 34 and a furnace lid 36 is closed to give an adequate seal for the exclusion of air and satisfactory retention of the pyrolyzing atmosphere to the imposed and the gaseous pyrolysis products which will be produced. Upon closure of the furnace 34 and lid 36, the furnace chamber is purged of air through exhaust port 38 by opening valve 40 and delivering a quantity of gas from carbon dioxide gas supply 42 into the furnace through inlet port 44.

When the furnace has been purged, the furnace temperature recoder and controller 8 is set to a predetermined pyrolysis temperature which results in satifactory operation with the particular combination of metal filler and organic binder. It has been found that temperatures between 350° and 900° C give satisfactory results for boron filled polymers and that a temperature from about 525° C to 600° C gives optimum results for boron filled ethylene/vinyl acetate/vinyl alcohol terpolymer.

It has been found that a three hour pyrolysis at substantially atmospheric pressure is sufficient to decompose the polymeric matrix. It is felt that the carbon dioxide inhibits the formation of carbonaceous residue and promotes the release of volatile fragments. The following compounds have been found in the off-gas; alkenes and alkadienes of $C_2$ and $C_8$, acetic acid, carbon monoxide, carbon dioxide, methane, traces of toluene diisocyanate, hydrogen cyanide, nitrogen dioxide, water, benzene, phenol, and possible benzilnitrile.

The carbon dioxide gas circulates around and through the boron filled polymer and exits along with the gaseous decomposition products through exhaust port 8 into a chemical scrubber 46 equipped with a vacuum breaker 48 and filled with an appropriate absorbent medium. An aqueous solution of sodium hydroxide has been found to satisfactorily absorb the acetic acid, toluene diisocyanate and hydrogen cyanide. The non-absorbed gaseous products exit the scrubber through scrubber outlet 52 to a flare burner 54 where they are consumed, and the resulting combustion products pass through a monitored stack vent 56 and thence into the atmosphere. A catalytic converter may be used in place of the chemical scrubber and flare.

In the preferred embodiment of the invention it has been found that the pyrolysis step may be controlled by heating for a fixed period of time, say three hours. It is to be understood that more sophisticated techniques can be used to monitor the progress of the reaction, among which are the measurement of the changing weight of the pyrolyzing boron filled polymer or the measurement of the changing composition or oxidation potential of the gases that exhaust from the furnace.

When the pyrolysis step is complete the furnace temperature controller 8 is set to a low temperature and the cannister 30 is allowed to cool within the furnace 34, the carbon dioxide gas atmosphere being maintained throughout the cooling period to protect the metal filler powder from oxidation and to continue the purging of any latent off-gassing which might ocur.

Figure 3:
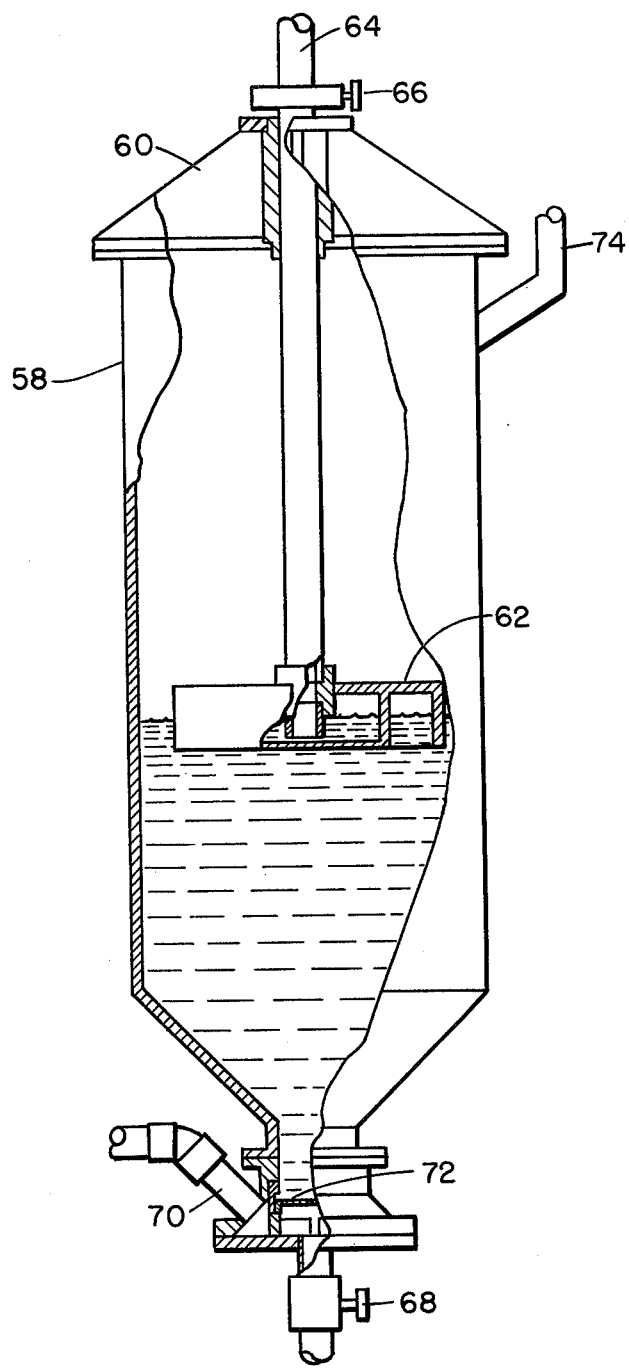
FIG. 3 illustrates an apparatus which is suitable for performing the deagglomeration 12, leaching 14, and rinsing 16 steps of the method of this invention.

When cool, the pyrolyzed material, largely boron powder agglomerates or clinkers, is transported to the apparatus illustrated in FIG. 3. In performing the subsequent steps of the method of this invention, an apparatus may be used for deagglomeration 12, leaching 14, and rinsing 16 which apparatus comprises a reactor 58 having a reactor lid 60 and a vent 74 adjacent the top of the reactor. Adjacent the bottom of the reactor is a fine mesh screen 72 and below the screen is a conduit 70 for the addition of fluid to the reactor and a drain valve for controlling the withdrawal of liquid from the reactor. Associated with the lid of the reactor is a locking collar 66 which grips the stem 64 of float assembly 62 which is disposed in the interior of the reactor.

To begin operation the float assembly 62 is pulled to an upper position adjacent an upper position of reactor 58 and fixed therein by tightening locking collar 66. The reactor lid 60 is removed and pyrolyzed boron filled polymer 32 is placed in the empty reactor 58. The reactor lid is then replaced and sealed to achieve a leak tight chamber capable of withstanding a pressure of at least 15 psig. A deagglomerating liquid is then introduced into the reactor through inlet conduit 70. Water, or water with a pH adjusted to 2.5 by appropriate additions of hydrochloric acid have been found to be satisfactory deagglomrating liquids. Five thousand grams of pyrolyzed material and approximately 50 liters of water comprise a deagglomerating charge. If desired, the temperature of the reactor contents may be elevated by introducing steam through inlet conduit 70.

Nitrogen or compresed air is then introduced into the bottom of the reactor through the inlet conduit for the purpose of agitating the pyrolyzed composite clinkers in the deagglomerating liquid. The volume of this flow of agitation gas is determined by that amount necessary for vigorous and turbulent movement of the clinkers and powder in the deagllomerating liquid medium, but without excessive loss of the deagglomerating liquid and slurry through the vent 74. The agitation of the clinkers in the deagglomeration liquid gradually converts the aggregated particles into a slurry of individual particles of filler material of various sizes in a turbulent medium containing substantially all water soluble solid pyrolysis products (including oxides of the filler material) which had cemented the particles into agglomerates. Four hours of agitation has been determined to be a sufficient time to adequately deagglomerate the clinkers.

As the end of the deagglomeration interval, the gas agitation is terminated and the particles of filler material are allowed to settle in the quiescent deagglomerating liquid. Thirty minutes has been determined to be a sufficient time to adequately settle the filler particles. Of course, if desired, a more sophisticated control could be maintained over the settling by, for instance, using instrumentation such as a turbidity sensor to determine when settling was complete.

The supernatant deagglomerating liquid is then decanted or separated from the settled filler powder by loosening the locking collar 66 and moving or permitting movement of the float assembly so that it rests on the surface of the liquid, and pumping the liquid out through the stem 64 to another vessel (not pictured). The pumping is continued until float assembly comes to rest upon the surface of the settled filler material.

If it is desired to more completely remove the soluble pyrolysis products (such as boric acid) from the bed of filler material additional cycles of agitation, settling and separation may be performed. It has been found that in these additional cycles an agitation interval of about 20 minutes and a settling interval of about 20 minutes yield satisfactory results. The additional liquids generated in these additional deagglomeration cycles are combined with that from the first cycle and are further processed in settling step 20, to be discussed later.

The resulting sedimentation bed in reactor 58 is now ready to undergo the leaching step 14 is designed to remove impurities from the filler powder. The exact nature of the leachant is dependant on the nature of the filler and the nature of the impurities involved. In the case of boron, mineral acids such as hydrochloric and hydrofluoric acids give satisfactory results. Because of advantages more fully discussed later, the use of hydrofluoric acid is beneficieal in a subsequent neutralization step 22 and is therefore used in the preferred embodiment of the invention.

Sufficient concentrated hydrofluoric acid is added to the bed of deagglomerated material remaining in reactor 55 to cover said bed (about 5 liters). The bed is then agitated with nitrogen for approximately four hours to effect the dissolution of impurities.

At the end of leach step, the leached filler powder is ready for the rinse step 16, wherein 37.5 liters of water is added to reactor 58 and agitation is contnued for 15 minutes. Agitation is ceased and the powder is allowed to settle for 30 minutes. The supernatant liquid is then removed in a manner to that in the deagglomeration step 12 and transferred to a third vessel (not required) for further treatment in accordance with the neutralization step 22, hereinafter described.

The rinse step is repeated for four additional cycles each time adding 37.5 liters of water, agitating for 15 minutes and allowing to settle for thirty minutes. After the final rinse cycle has been completed, the residual rinse water remaining in the reactor is drained away by opening drain valve 68.

The filler powder is then ready for the drying step 18. This may be accomplished by either blowing dry gas through the bed in the reactor vessel or by removing the powder from the reactor and drying in a vacuum oven. It has been found that drying in a vacuum oven at 121° C gives satisfactory results. The dried filler powder is now ready for use without further chemical treatment. Typical purities for boron filler recovered by the method of this invention are given in Table I.

TABLE I

TYPICAL PURITY OF BORON POWDER

| Element | Recovered Boron Lot No. | | | |
| --- | --- | --- | --- | --- |
| | Run 1 | Run 2 | Run 3 | Run 4 |
| Be | 1 | 0.5 | 2 | 0.5 |
| Na | NA | 11 | 4 | 20 |
| Mg | 6 | 1068 | 96 | 80 |
| Al | 14.5 | 13 | ND | 0.7 |
| Si | 353 | 822 | 896 | 100 |
| P | 2 | 2 | 2 | 2 |
| S | 2 | 3 | 2 | 2 |
| Cl | 9 | 2 | 2 | 2 |
| K | 7 | ND | ND | ND |
| Ca | 17 | 1 | 1 | 1 |
| Ti | 5 | 7 | ND | ND |
| V | 2 | 0.1 | ND | ND |
| Cr | 5 | 73 | 88 | 20 |
| Mn | 0.5 | 10 | 3 | 1.4 |
| Fe | 185 | 207 | 141 | 13 |
| Ni | 2 | 6 | 2 | 3 |
| Cu | 15 | 26 | 16 | 0.5 |
| Zn | 5 | ND | ND | ND |
| Br | 15 | ND | 6 | 1 |
| Sr | 8 | 12 | 16 | ND |
| Mo | 2.5 | 1.3 | 0.1 | 0.1 |
| Ag | 0.1 | 0.1 | 0.1 | 0.1 |
| Sn | 5 | ND | 1 | 6 |
| Ba | 8 | 7 | ND | ND |
| Pb | 2 | 16 | 6 | 2.3 |
| %Total Carbon | 0.24% | 0.40% | 0.26% | 0.14% |

Purity values except for carbon are given in units of parts per million (ppm)
NA = No Analysis
ND = Not Detected In describing the deagglomeration step 12 hereinabove, it was stated that the deagglomeration liquid is transferred to a second vessel (not pictured) for a settling step 20. The deagglomerating liquid primarily contains very fine boron powder and boric acid solution. The boron powder is allowed to settle and the supernatant boric acid solution is decanted or drawn off using a float assembly and reactor similar to that used in the deagglomeration step (FIG. 3). When sufficient fine boron powder has been collected, it can be transferred to the reactor 58 of FIG. 3 for leaching as previously described.

The decanted liquid is transferred to a still where the water is distilled off 24 and the borid acid is concentrated. The boric acid is dried 28 and recycled to another plant where other chemical steps must be taken before the boron content can be reused.

In describing the rinsing step 16 hereinabove, it was stated that supernatant rinse liquids were transferred to a third vessel (not pictured) for neutralization. In the neutralization step 22, slaked lime ($Ca(OH)_2$) is first added to the liquid to make it's pH basic. Not only are impurities precipitated as hydroxides, but the fluoride ion is precipitated as $CaF_2$. If excess $Ca(OH)_2$ has been used, the excess may be precipitated as $CaCO_3$ by the subsequent addition of $CO_2$ gas. These combined precipitates may then be filtered out and disposed of as solid waste.

Because of the relatively large volume of water required in this process it may be desirable to recycle the water. If the aqueous product from the neutralization step is not pure enough for reuse directly the aqueous product may be further purified before being combined with water from the distillation step and reused either in the deagglomeration or rinsing steps. The purification step 26 may be any of a large number well known in the industry including reverse osmosis, ion exchange, electrodialysis, crystallization and distillation.

EXAMPLE 1

A 13.5 gram sample of boron filled molding compound is pyrolyzed under the following conditions. The sample may be in the form of about 2 millimeter diameter pellets in which the binder is a block copolymer of polybutadiene and polystyrene. The material is placed in a ceramic beaker and heated to 600° C for 3 hours in a carbon dioxide atmosphere. The ash or clinker retains the shape of the original pellets but promptly disintegrates into a crystalline powder upon the addition of methyl alcohol. After drying, the powder may be examined under a microscope and no carbonaceous residue will be observed.

EXAMPLE 2

A molded disc containing about one kilogram of boron powder is an ethylene/vinyl acetate/vinyl alcohol terpolymer is loaded into a stainless steel beaker which in turn is placed in a large air-circulating furnace. The furnace is purged with carbon dioxide gas sufficiently to remove over 95% of the air initially present. The carbon dioxide purge is continued while the furnace is heated to 525° C and maintained at that temperature for three hours after which time the furnace is cooled to room temperature with continuous purging. The beaker containing the ashed product is removed and transported to the deagglomeration apparatus.

The deagglomerration apparatus may comprise an 18 liter glass reactor vessel fitted with an appropriate heating mantle and glass lid. A temperature sensor, a water cooled condenser, and nitrogen inlet tube or bubbler may be fitted into the glass lid. 15 liters of water are added to the vessel and heated to 190° F ± 10° F. The pyrolyzed product is added and the lid is replaced. The outlet of the nitrogen bubbler is fixed at the bottom of the vessel and vigorous bubbling is initiated. The process is continued for three hours to ensure deagglomeration of the product or clinkers, after which time the power to the heating mantle and the nitrogen bubbler are turned off.

The resulting slurry is allowed to settle until only very fine particles remain in suspension as determined by visual inspection. After settling has occurred, another tube is mounted in one port in the lid and extended to a level just above the settled material. Nitrogen is applied to the space above the slurry so as to force the water and very small particles of boron through the tube and into a polypropylene tank. The slurry is siphoned off leaving the coarser powder in the bottom of the reaction vessel. The coarse powder is washed with successive 15 liter quantaties of water using the procedure of addition, stirring for 20 minutes, settling for 15 minutes and siphoning. All washings are combined with deagglomeration slurry in the polypropylene tank for later recovery of the boron present as fine powder and as boric acid.

The coarse material is transferred to another polypropylene tank for acid leaching to remove metals and metallic oxide impurities. Sufficient concentrated hydrofluoric acid is added to the tank to cover the powder. This is allowed to stand at room temperature for four hours after which the acid is diluted with about 15 liters of water. The powder is allowed to settle for 15 minutes and then liquid is siphoned into a holding tank for neutralization. The powder is washed several times with water according to the procedure of addition, stirring for 20 minutes, settling for 15 minutes and siphoning. The acid solution is neutralized with sodium bicarbonate.

Separation and recovery of the boric acid solution from the deagglomeration step is accomplished by allowing the very fine powder to settle for 16 to 24 hours and then siphoning the solution into a container for evaporation. The powder is acid leached by the same technique as used with the coarse powder except settling times are increased to 24 hours.

The dried boron powders are combined and analyzed. The yield of boron as the crystalline powder is 97.50% and the powder shall be found to contain 98.98% total boron. With the addition of boron received as boric acid, the overall recovery yield of boron is 99.32%. The combined powders are found to contain 0.62% total carbon and 0.02% boric acid.

EXAMPLE 3

Approximately two kilograms of boron filled ethylene/vinyl acetate/vinyl alcohol terpolymer is loaded in a rectangular retort and placed in a Harrop furnace at room temperature. After a thirty minute carbon dioxide purge to ensure the elimination of air from the retort and furnace, the furnace is turned on and set for a temperature of 525° C. Typically it takes this furnace 1½ hours to reach this temperature. The furnace is maintained at this temperature for 3 hours and then turned off and allowed to cool. The flow of carbon dioxide is maintained throughout the pyrolysis and through the cooling step until the retort temperature has dropped to 260° C.

The pyrolyzed material from several two kilogram lots of filled polymer is combined to form one 5 kilogram batch of pyrolyzed clinkers. A cylindrical polypropylene vessel about 32 inches tall and 12 inches in diameter equipped with a float assembly, vent, and bottom drain similar to that in FIG. 3 is half-filled with water acidified with hydrochloric acid to a pH of 2.5. The 5 kilogram batch is added to the vessel and additional 18.5 liters of water is added. The lid is secured to the top of the vessel and deagglomeration is begun by introducing nitrogen into the bottom of the vessel.

After 4 hours and 20 minutes, agitation is stopped by stopping the flow of nitrogen and the slurry is allowed to settle for 30 minutes. At the end of the settling period the supernatant liquid is drawn off using the float assembly. Two additional cycles of agitation, settling, and separation are performed using 18 minute settling times and 20 minute agitation times.

5 liters of concentrated hydrofluoric acid is added to the resulting sedimentation bed and gently agitated with nitrogen for 4 hours. The 32.5 liters of water are then added, mixed by nitrogen agitation, and then allowed to settle for 30 minutes before being decanted using the float assembly. Four more rinse cycles are performed each using 37.5 liters of water, 30 minute settling times, and 15 minute agitation period. At the conclusion of the final rinse cycle, the remaining liquid is drained from the bottom of the vessel.

The purified boron is removed from the vessel and placed in a stainless steel drying tray for drying in an oven at 121° C.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What we claim is:

1. A method for recovering a boron filler material from a polymer matrix carrying said filler material comprising housing said matrix in a container, supplying carbon dioxide gas to the interior of said container, heating said container and matrix to a temperature of not less that about 525° C to react essentially only the matrix with said carbon dioxide gas, removing products of said reaction from said container, removing boron filler material from said container and subjecting said boron filler material to a water bath to dissolve therefrom water-soluble products of said reaction, forcing a gas through said material to deagglomerate said material, and subjecting said material to an acid bath to dissolve therefrom acid-soluble products of said reaction.

2. The method of claim 1 wherein the polymer matrix is an ethylene/vinyl acetate/vinyl alcohol terpolymer.

3. The method of claim 1 wherein the acid is hydrochloric acid or hydrofluoric acid.

4. The method of claim 1 wherein the matrix is heated to a temperature in the range of 525° C to 600° C.

5. A method for recovering a boron filler material from an ethylene/vinyl acetate/vinyl alcohol terpolymer matrix comprising the steps:

(a) heating said matrix in the presence of carbon dioxide gas to a temperature in the range of 525° C to 600° C until at least a portion of said matrix reacts with said carbon dioxide gas;

(b) adding water which has been acidified to a pH of 2.5 to any solid residue of step (a);

(c) agitating the mixture of step (b) by blowing nitrogen gas through said mixture thereby causing at least a portion of said boron filler to be released from said matrix;

(d) settling said released boron filler thereby creating a supernatant layer comprising an aqueous solution of boric acid and a subjacent layer comprising boron powder and water insoluble impurities;

(e) separating the supernatant layer of step (d) from the subjacent layer;

(f) repeating the steps (b) through (e) together with adding non-acidified water in step (b);

(g) adding hydrofluoric acid to the subjacent layer;

(h) agitating the mixture of step (g) by blowing nitrogen gas through said mixture causing at least a portion of said water insoluble impurities to dissolve in the hydrofluoric acid;

(i) adding water to the mixture of step (h) and continuing to agitate;

(j) settling the mixtur of step (i) thereby creating a supernatant layer comprising an aqueous solution of hydrofluoric acid and impurities soluble therin;

(k) separating the supernatant layer from the subjacent layer;

(l) repeating the steps (i) through (k) about four additional times;

(m) drying the subjacent layer of step (k) thereby producing powdered boron;

(n) further settling the supernatant layer of step (e) thereby creating a supernatant layer comprising an aqueous solution of boric acid and a subjacent layer comprising very fine boron powder;

(o) separating the supernatant layer of step (n) from the subjacent layer and transferring the subjacent layer to step (g);

(p) distilling the supernatant layer of step (n) thereby obtaining a product comprising concentrated boric acid, and purifying water for reuse in steps (b), (f), and (i);

(q) precipitating dissolved solids from the supernatant layer of step (k) by adding $Ca(OH)_2$;

(r) precipitating further dissolved solids from the supernatant layer of step (q) by the addition of $CO_2$;

(s) separating the precipitated solids of steps (q) and (r) from the supernatant layer; and (t) purifying the supernatant layer of step (s) by reverse osmosis thereby obtaining water for reuse in steps (b), (f), and (i).

* * * * *